June 2, 1925.

P. RHOADES

AUTOMOBILE ATTACHMENT

Filed March 12, 1924

Paul Rhoades INVENTOR

BY Victor J. Evans

WITNESSES

ATTORNEY

June 2, 1925.

P. RHOADES

AUTOMOBILE ATTACHMENT

Filed March 12, 1924

Paul Rhoades
INVENTOR

BY Victor J. Evans
ATTORNEY

WITNESSES

Patented June 2, 1925.

1,539,914

UNITED STATES PATENT OFFICE.

PAUL RHOADES, OF CRAWFORDSVILLE, INDIANA.

AUTOMOBILE ATTACHMENT.

Application filed March 12, 1924. Serial No. 698,751.

*To all whom it may concern:*

Be it known that I, PAUL RHOADES, a citizen of the United States, residing at Crawfordsville, in the county of Montgomery and State of Indiana, have invented new and useful Improvements in Automobile Attachments, of which the following is a specification.

This invention relates to attachments for engines and has for an object the provision of means which may be attached to the crank case of an automobile engine, whereby the said case may be conveniently drained.

Another object of the invention is the provision of an attachment for this purpose which will direct the oil from the crank case to one side of the automobile for more convenient handling.

More specifically stated, the invention aims to provide a novel form of valve for controlling the drain opening of an engine crank case, together with means for directing the oil to one side of the car, the last mentioned means also serving as a bearing for a valve operating member, while the latter has a removable connection with the valve and in turn provides a support for the oil directing means.

With the above and other objects in view, the invention further includes the following novel features and details of construction, to be hereinafter more fully described, illustrated in the accompanying drawings and pointed out in the appended claims.

In the drawings:—

Figure 1:
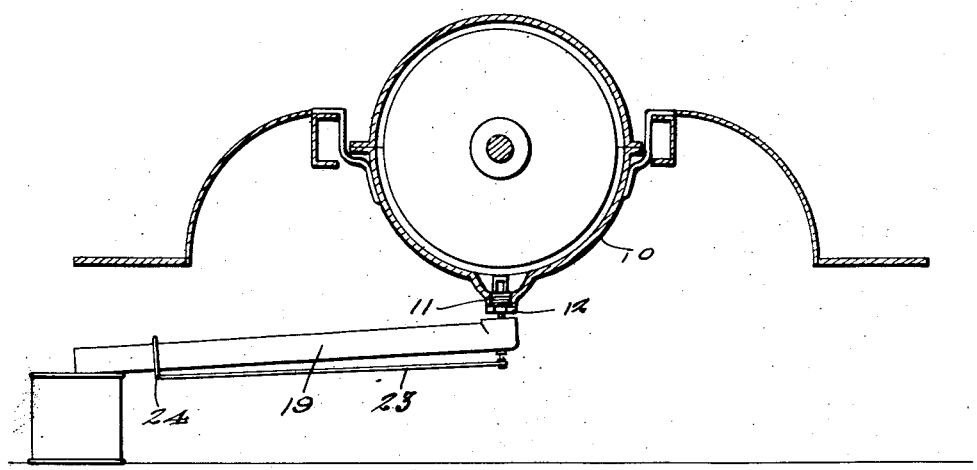
Figure 1 is a transverse section showing a fragmentary portion of an automobile with the invention applied.
Figure 2:
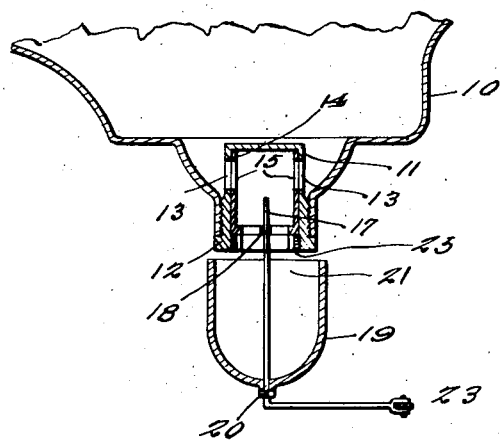
Figure 2 is a section at right angles to Figure 1.
Figure 6:
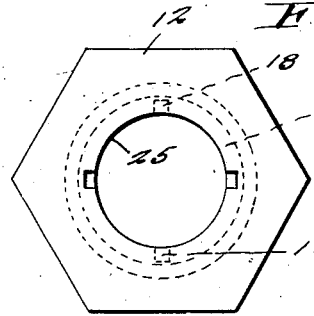
Figure 6 is a bottom plan view of the valve.
Figure 3:
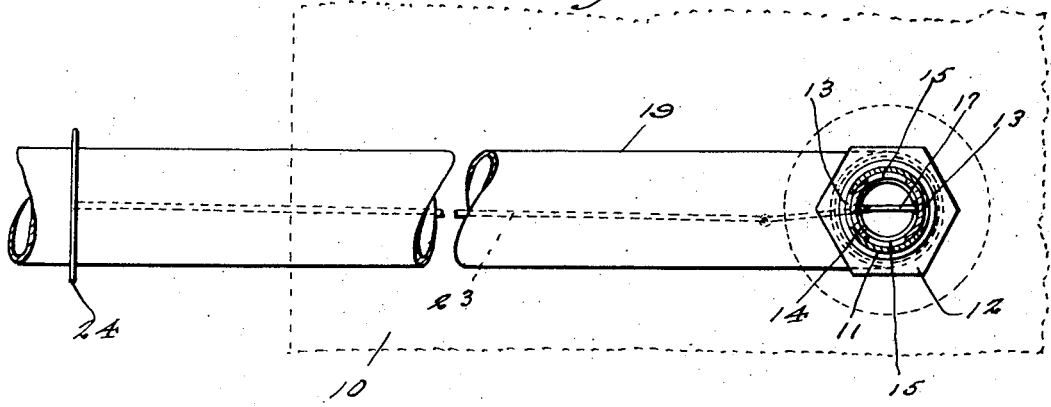
Figure 3 is a horizontal section with the valve closed and a portion of the crank case shown by dotted lines.
Figure 4:
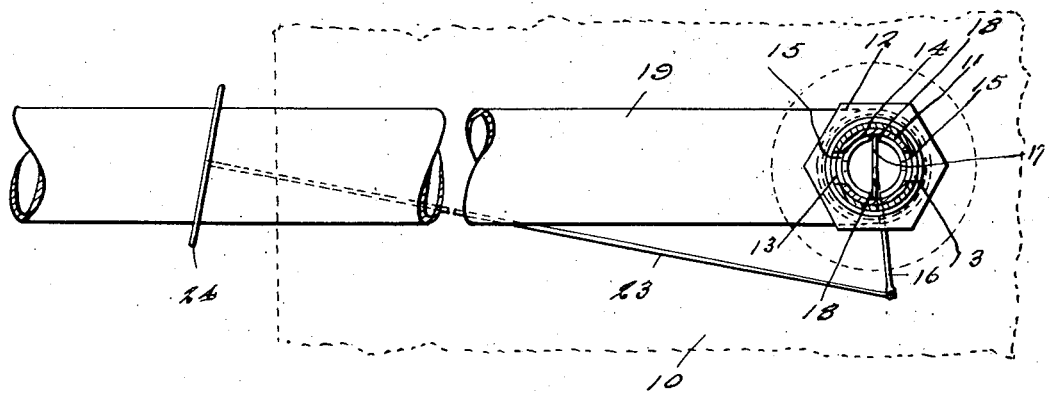
Figure 4 is a similar view with the valve open.
Figure 5:
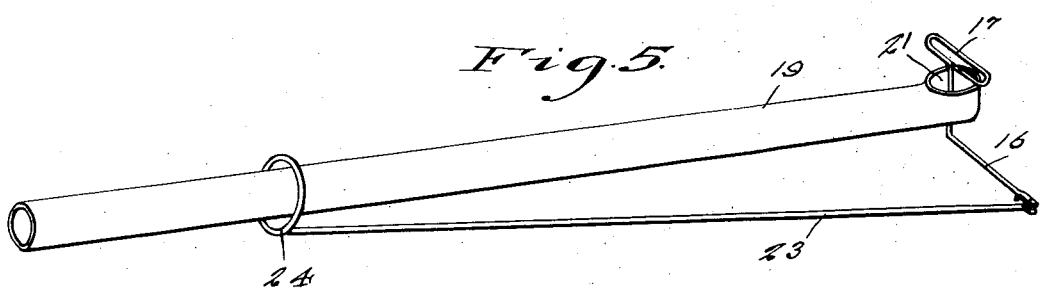
Figure 5 is a perspective view of a combined drain pipe and valve operating member.

Referring to the drawings in detail wherein like characters of reference denote corresponding parts, the reference character 10 indicates a portion of the crank case of an automobile engine having the usual drain opening through which oil is drained from the crank case. In some types of automobiles it is necessary to get under or reach beneath the car for the purpose of opening the drain cock which controls this opening and in order to provide a more convenient means, the present invention provides a valve and means for operating the valve from one side of the car. This valve comprises a valve casing 11 which is of hollow cylindrical formation and is closed at one end, being provided at its opposite end with a flange 12 and with external threads for engagement with the threads of the drain opening. The valve casing is provided with spaced openings 13 which are controlled by a valve sleeve 14, the latter being rotatable within the casing 11 and having spaced openings 15 therein. The openings 15 are adapted to be moved into and out of register with the openings 13.

In order to rotate the sleeve 14 so as to move the openings 15 into and out of register with the openings 13, there is provided a substantially L-shaped valve lever 16 which is provided at one end with oppositely disposed lateral extensions forming a head 17 for removable engagement within oppositely located notches 18 provided in the sleeve 14. The lever 16 extends transversely through one end of a drain pipe 19 and is pivotally mounted in said pipe as indicated at 20, while an opening 21 is provided in the pipe opposite this pivotal point. One end of the pipe 19 is closed while the opposite end is open. Pivotally secured to one end of the lever 16 is one end of an operating rod 23. The opposite end of this rod is provided with a loop or ring 24 which receives the pipe 19 and by moving this loop or ring along the pipe, the valve lever 16 may be rocked upon its pivots to operate the valve.

Normally, the valve lever is disengaged from the valve and when it is desired to open the valve, the head of the lever is engaged within the notches 18 and the valve is rotated. This rotation causes the openings 13 and 15 to be brought into register, while an inwardly extending flange 25 provided on the valve casing 11 acts to support the head so as to prevent its accidental disengagement from the valve. Oil from the crank case will flow through the valve and through the opening 21 in the pipe 19 and will pass through the pipe into a suitable receptacle at one side of the car. By moving the operating rod in a direction toward the discharge end of the pipe 19, the valve may be closed and the head 17 disengaged. It will thus be seen that the valve lever acts as a support for the inner end of the drain pipe, while the latter provides a bearing for the operation of the valve lever.

The invention is susceptible of various changes in its form, proportions and minor details of construction and the right is herein reserved to make such changes as properly fall within the scope of the appended claims.

Having described the invention what is claimed is:—

1. The combination with an engine crank case having a drain opening therein, of a valve for controlling the opening, a drain pipe and means carried by the drain pipe and having a detachable connection with the valve, whereby the latter may be operated.

2. The combination with an engine crank case having a drain opening therein, of a sleeve valve for controlling the opening, a drain pipe and means carried by the drain pipe and having a detachable connection with the valve whereby the latter may be operated.

3. The combination with an engine crank case having a drain opening therein, of a valve comprising a hollow cylindrical member provided with an opening and adapted to be secured within the drain opening of the crank case, a sleeve rotatable within the cylindrical member and provided with an opening adapted to be moved into and out of register with the opening of the cylindrical member to control the drain opening, a drain pipe and an operating member mounted upon the drain pipe and engageable with the sleeve, whereby the latter may be rotated.

4. The combination with an engine crank case having a drain opening therein, of a sleeve comprising a hollow cylindrical member provided with an opening and adapted to be secured within the drain opening of the crank case, a sleeve rotatable within the cylindrical member and provided with an opening adapted to be moved into and out of register with the opening in the cylindrical member to control the drain opening, an operating member detachably connected to the sleeve and a drain pipe connected with the operating member.

5. The combination with an engine crank case having a drain opening therein, of a valve comprising a hollow cylindrical member provided with an opening and adapted to be secured within the drain opening of the crank case, a sleeve rotatable within the cylindrical member and provided with an opening adapted to be moved into and out of register with the opening in the cylindrical member to control the drain opening, a drain pipe adapted to be positioned within the drain opening, a valve lever having a bearing in said pipe and engaging the sleeve.

In testimony whereof I affix my signature.

PAUL RHOADES.